(12) United States Patent
Huber et al.

(10) Patent No.: US 12,656,155 B2
(45) Date of Patent: Jun. 16, 2026

(54) DEVICE FOR DETERMINING A FLOW-RATE-DEPENDENT VARIABLE OF A FLOWABLE ELECTRICALLY CONDUCTIVE MEDIUM

(71) Applicant: Endress+Hauser Flowtec AG, Reinach (CH)

(72) Inventors: Christof Huber, Bern (CH); Raphael Kuhnen, Schliengen (DE); Anne Habermehl, Erding (DE); Wolfgang Drahm, Freising (DE)

(73) Assignee: Endress+Hauser Flowtec AG, Reinach (CH)

( * ) Notice: Subject to any disclaimer, the term of this patent is extended or adjusted under 35 U.S.C. 154(b) by 350 days.

(21) Appl. No.: 18/689,740

(22) PCT Filed: Aug. 10, 2022

(86) PCT No.: PCT/EP2022/072433
§ 371 (c)(1),
(2) Date: Mar. 6, 2024

(87) PCT Pub. No.: WO2023/030840
PCT Pub. Date: Mar. 9, 2023

(65) Prior Publication Data
US 2025/0102334 A1 Mar. 27, 2025

(30) Foreign Application Priority Data
Sep. 6, 2021 (DE) ..................... 10 2021 122 993.6

(51) Int. Cl.
*G01F 1/58* (2006.01)
(52) U.S. Cl.
CPC .................................. *G01F 1/582* (2013.01)

(58) Field of Classification Search
CPC ....... G01F 1/582; G01F 25/10; G01R 33/028; G01R 33/032
See application file for complete search history.

(56) References Cited

U.S. PATENT DOCUMENTS

| | | | |
|---|---|---|---|
| 2013/0139609 | A1 | 6/2013 | Pinton et al. |
| 2013/0214773 | A1 | 8/2013 | Ueno |

(Continued)

FOREIGN PATENT DOCUMENTS

| | | |
|---|---|---|
| DE | 102013204568 A1 | 10/2013 |
| DE | 102015008995 A1 | 1/2017 |
| DE | 102017205265 A1 | 10/2018 |

*Primary Examiner* — Thomas M Hammond, III
(74) *Attorney, Agent, or Firm* — Mark A. Logan; Endress+Hauser (USA) Holding, Inc.

(57) ABSTRACT

A device for determining a flow-rate-dependent variable of a flowable and conductive medium in a guide body for guiding the medium includes a magnetic-field-generating device for generating a first magnetic field that separates mobile charge carriers in the medium and a magnetic-field-sensitive measuring arrangement for determining a second magnetic field that is generated by the mobile charge carriers. The magnetic-field-sensitive measuring arrangement includes a first magnetic-field-sensitive measuring device having a magnetic-field-sensitive and optically excitable material, an optical excitation unit for the optical excitation of the first magnetic-field-sensitive measuring device, and an optical detection unit for detecting a measurement signal that correlates with a change and/or a strength of the second magnetic field. An evaluation circuit is configured to determine the flow-rate-dependent variable, measurement signals of at least two different magnetic field states influencing the determination of the flow-rate-dependent variable.

17 Claims, 3 Drawing Sheets

(56)     References Cited

U.S. PATENT DOCUMENTS

| 2015/0268076 | A1 * | 9/2015 | Florin | ..................... | G01F 25/10 |
| | | | | | 73/861.12 |
| 2017/0306751 | A1 * | 10/2017 | Harrison | ............... | E21B 49/082 |
| 2018/0335328 | A1 * | 11/2018 | Moth | ...................... | G01F 15/02 |
| 2018/0372523 | A1 * | 12/2018 | Alkhabbaz | ................ | G01F 1/24 |
| 2020/0057117 | A1 | 2/2020 | Nishibayashi et al. | | |
| 2020/0132785 | A1 | 4/2020 | Yoshii | | |
| 2021/0255254 | A1 | 8/2021 | Lo et al. | | |

* cited by examiner

DEVICE FOR DETERMINING A FLOW-RATE-DEPENDENT VARIABLE OF A FLOWABLE ELECTRICALLY CONDUCTIVE MEDIUM

CROSS-REFERENCE TO RELATED APPLICATIONS

The present application is related to and claims the priority benefit of DPMA Patent Application No. 10 2021 122 993.6, filed on Sep. 6, 2021, and International Patent Application No. PCT/EP2022/072433, filed Aug. 10, 2022, the entire contents of which are incorporated herein by reference.

TECHNICAL FIELD

The invention relates to a device for determining a flow-rate-dependent variable of a flowable and conductive medium.

BACKGROUND

Magneto-inductive flow measurement devices are used for determining the flow rate and the volumetric flow of a flowing medium in a pipeline. A distinction is made here between in-line magneto-inductive flow meters and magneto-inductive flow measuring probes, which are usually inserted into a lateral opening of a pipeline. A magneto-inductive flow meter has a device for producing a magnetic field, which produces a magnetic field perpendicularly to the flow direction of the flowing medium. Single coils are typically used for this purpose. In order to realize a predominantly homogeneous magnetic field, pole shoes are additionally formed and attached such that the magnetic field lines run over the entire pipe cross-section substantially perpendicularly to the transverse axis or in parallel to the vertical axis of the measuring pipe. In addition, a magneto-inductive flow meter has a measuring pipe on which the device for producing the magnetic field is arranged. A measurement electrode pair that contacts the medium and is attached to the lateral surface of the measuring pipe taps an electrical measurement voltage or potential difference which is applied perpendicularly to the direction of flow and to the magnetic field and occurs when a conductive medium flows in the direction of flow when the magnetic field is applied. Since, according to Faraday's law of induction, the tapped measurement voltage depends on the velocity of the flowing medium, the flow rate and, with the inclusion of a known pipe cross-section, the volumetric flow can be determined from the induced measurement voltage.

In contrast to a magneto-inductive flow meter, which comprises a measuring tube for conducting the medium with an attached device for generating a magnetic field penetrating the measuring tube and with measuring electrodes, magneto-inductive flow measuring probes are inserted with their usually circular cylindrical housings into a lateral opening of a tube line and fixed in a fluid-tight manner. A special measuring tube is no longer necessary. The measurement electrode arrangement and coil arrangement, mentioned in the introduction, on the lateral surface of the measuring pipe are omitted and are replaced by a device for producing a magnetic field, which device is arranged in the interior of the housing and in direct proximity to the measurement electrodes and is designed such that an axis of symmetry of the magnetic field lines of the produced magnetic field perpendicularly intersects the front face or the face between the measurement electrodes. In the prior art, there is already a plurality of different magneto-inductive flow measuring probes.

Magneto-inductive flow measurement devices are often used in process and automation engineering for fluids, starting from an electrical conductivity of approximately 5 μS/cm. Corresponding flow measurement devices are sold by the applicant in a wide variety of embodiments for various fields of application, for example under the name PROMAG or MAGPHANT.

SUMMARY

The invention is based on the object of providing an alternative device for determining a flow-rate-dependent variable of a flowable medium.

The object is achieved by the device according to the present disclosure.

The device according to the invention for determining a flow-rate-dependent variable of a flowable and conductive medium in a guide body for guiding the medium, in particular a measuring pipe or a pipeline, comprises:

a magnetic-field-generating device for generating a mobile charge carrier in the first magnetic field separating the medium;

a magnetic-field-sensitive measuring arrangement for determining a second magnetic field generated by the mobile charge carriers, wherein the magnetic-field-sensitive measuring arrangement comprises a first magnetic-field-sensitive measuring device with a magnetic-field-sensitive and optically excitable material, wherein the magnetic-field-sensitive measuring arrangement has at least one optical excitation unit for the optical excitation of the first magnetic-field-sensitive measuring device and an optical detection unit for detecting a measurement signal, in particular a fluorescence signal, which correlates with a change and/or a strength of the second magnetic field; and an evaluation circuit which is configured to determine the flow-rate-dependent variable, wherein measurement signals of at least two different magnetic field states are included in the determination of the flow-rate-dependent variable.

The difference in the second magnetic field generated by the charge carriers between the two different magnetic field states depends on the flow rate of the medium. If the magnetic field of at least two magnetic field states is known, the flow-rate-dependent variable—i.e. the flow rate, the volume flow, or the mass flow of the medium—can be determined from this.

The advantage of the device according to the invention is that the electrochemical influences occurring in conventional magneto-inductive flow measuring devices with medium-contacting measuring electrodes are avoided, which distort the measurement and even lead to degradation of the measuring electrodes.

The magnetic-field-sensitive measuring device takes over the function of the measuring electrodes, which in conventional magneto-inductive flow measuring devices are either arranged on the outer surface of the guide body—e.g. a carrier pipe—or extend through openings in the guide body into the interior of the carrier pipe and therefore contact the medium. The measuring electrodes in conjunction with a measuring circuit are configured to measure an induced measurement voltage in the medium which is proportional to the flow rate of the medium. It is advantageous compared to the second variant that, on the one hand, no openings, and thus potential leakage points, are necessary in the guide body and, on the other hand, wear is considerably reduced. The guide body can be made of an electrically insulating material or have an electrical insulation, a so-called liner, attached to the inner lateral surface.

The evaluation unit comprises at least one electronic circuit which is designed and configured to determine the flow-rate-dependent variable of the medium at least on the basis of the measurement signal provided by the magnetic-field-sensitive arrangement, in particular the fluorescence signal, which correlates with a change and/or a strength of a second magnetic field generated by the mobile charge carriers and to determine a conductivity of the medium. For this purpose, the electronic circuit can have electronic components such as passive components, energy sources, active components, integrated circuits, and/or embedded computer systems.

Advantageous embodiment of the invention are the subject matter of the dependent claims.

One embodiment provides that the magnetic-field-generating device comprises at least one permanent magnet, in particular two preferably diametrically arranged permanent magnets.

This has the advantage that no additional energy source and operating and/or control circuit is required for the magnetic-field-generating device.

One embodiment provides that the magnetic-field-generating device comprises at least one coil, in particular two preferably diametrically arranged coils.

An advantage of this embodiment compared to the embodiment with permanent magnets is that the at least two magnetic field states can be generated by the at least one coil. Furthermore, the possibility exists of determining the temporal change of the second magnetic field in dependence on a changing first magnetic field, and of including this in the determination of the flow-rate-dependent variable. A further advantage results from this, since in this way a device for determining the flow-rate-dependent variable of the flowable and conductive medium can be realized using exactly one first magnetic-field-sensitive measuring device.

One embodiment provides that the at least one coil is configured to generate the two different magnetic field states, wherein a first magnetic field state corresponds to the magnetic field present at the first magnetic-field-sensitive measuring device during a resting phase of the at least one coil, wherein, during the resting phase, the magnetic field present at the first magnetic-field-sensitive measuring device is less than a boundary value, in particular equal to zero, wherein a second magnetic field state corresponds to the magnetic field present at the first magnetic-field-sensitive measuring device during a feed phase of the at least one coil, wherein during the feed phase the magnetic field present at the first magnetic-field-sensitive measuring device is greater than the boundary value, wherein the detection unit is configured to detect a first measurement signal during the resting phase and a second measurement signal during the feed phase of the magnetic-field-generating device.

One embodiment provides that the magnetic-field-generating device and the first magnetic-field-sensitive measuring device are arranged in a common cross-sectional plane of the carrier body.

On the basis of a empty pipe calibration carried out before the device is put into operation, the first magnetic field generated by the magnetic-field-generating device can be determined and characterized at the position of the first magnetic-field-sensitive measuring device. This is thus known. When there is a flowing medium through the guide body, the mobile charge carriers experience, due to the generated first magnetic field, a force perpendicular to the first magnetic field and to the direction of flow. This leads to a separation of the charge carriers into two separate paths. These paths in turn each generate a second magnetic field which depends on the flow rate of the medium. The magnetic field actually present at the first magnetic-field-sensitive measuring device is therefore made up of the first magnetic field and the second magnetic field. If the first magnetic field generated by the first magnetic-field-generating device is known, the share of the second magnetic field and thus also the flow-rate-dependent variable of the medium can be determined.

One embodiment provides that the conductivity of the medium enters into the determination of the flow-rate-dependent variable.

The conductivity of the medium flowing through can be determined and made available by a conductivity sensor likewise arranged on the measuring pipe or the pipeline. Alternatively, for example in applications with a known and unchangeable medium, a conductivity can be specified by the operator.

One embodiment provides that the magnetic-field-sensitive measuring arrangement comprises a second magnetic-field-sensitive measuring device having a magnetic-field-sensitive material, wherein the first magnetic-field-sensitive measuring device and the second magnetic-field-sensitive measuring device are arranged so as to be offset relative to one another in the flow direction of the medium such that they are each exposed to different magnetic field states when the medium is flowing and the second magnetic field is present.

One embodiment provides that the magnetic-field-generating device is arranged between the first magnetic-field-sensitive measuring device and the second magnetic-field-sensitive measuring device.

The advantage of this embodiment is that a bidirectional measurement is enabled.

One embodiment provides that the first magnetic-field-sensitive measuring device is arranged between the magnetic-field-generating device and the second magnetic-field-sensitive measuring device.

One embodiment provides that a distance of the first magnetic-field-sensitive measuring device and/or of the second magnetic-field-sensitive measuring device to the magnetic-field-generating device is selected in such a way that the first magnetic field present at the first magnetic-field-sensitive measuring device and/or at the second magnetic-field-sensitive measuring device is less than a boundary value.

One embodiment provides that the device comprises a control circuit, wherein the control circuit is configured to regulate an operating variable of the magnetic-field-generating device in such a way that measured values of the measurement signal of the magnetic-field-sensitive measuring arrangement, in particular of the first magnetic-field-sensitive measuring device and/or of the second magnetic-field-sensitive measuring device, assume a target value, wherein the evaluation circuit is configured to determine the flow-rate-dependent variable depending on the operating variable and/or a change in the operating variable.

One embodiment provides that the evaluation circuit is configured to determine the flow-rate-dependent variable on the basis of a first measurement signal detected in the first magnetic-field-sensitive measuring device in conjunction with a second measurement signal detected in the second magnetic-field-sensitive measuring device or a reference signal.

One embodiment provides that the magnetic-field-generating device and/or the magnetic-field-sensitive measuring arrangement can be attached to an outer lateral surface of the guide body in a mechanically separable manner.

Since the first magnetic-field-sensitive measuring device does not necessarily have to be in contact with a medium, there is the possibility of realizing a clamp-on device that can be attached to existing pipelines. This has the advantage that the devices can be mounted at the measuring points or devices can be replaced without having to interrupt existing processes. A mechanically separable connection of the device to the guide body excludes a material connection of individual components of the device according to the invention. According to an advantageous embodiment, the magnetic-field-generating device and/or the magnetic-field-sensitive measuring arrangement are connected to the guide body via a detachable clamp connection.

One embodiment provides that the device has a fastening device with which the magnetic-field-generating device and/ or the magnetic-field-sensitive measuring arrangement can be detachably fastened to the outer lateral surface.

One embodiment provides that the first magnetic-field-sensitive measuring device comprises a crystal body with at least one defect center or a gas cell.

One embodiment provides that the crystal body is a diamond having at least one nitrogen defect, a silicon carbide having at least one silicon defect, or a hexagonal boron nitride having at least one defect color center.

One embodiment provides that the gas cell comprises at least one cell enclosing a gaseous alkali metal.

The device comprises an excitation unit for optically exciting the subunit, i.e. the optically excitable material or the crystal body or the gas cell, and a detection unit for detecting a fluorescence signal of the crystal body or the gas cell, which correlates with the magnetic field acting on the first magnetic-field-sensitive measuring device, in particular the optically excitable material. Optionally, filters and mirrors as well as further optical elements can be used to direct an excitation light to the crystal body or to the gas cell and/or the fluorescence signal towards the detection unit. The crystal body can optionally be acted upon with an in particular frequency-dependent microwave signal which is generated by a microwave unit which can be part of the first magnetic-field-sensitive measuring unit, or integrated in the first magnetic-field-sensitive measuring unit, or can be designed as a separate unit.

It is advantageous that, due to the precise magnetic field measurements, including of very low magnetic fields, applications are possible with a medium which has a very low conductivity (i.e. $\sigma \ll 5$ $\mu$S/cm), for which conventional magneto-inductive flow measuring devices are unsuitable.

BRIEF DESCRIPTION OF THE DRAWINGS

The present disclosure is explained in greater detail with reference to the following figures. In the figures.

DETAILED DESCRIPTION

Figure 1:
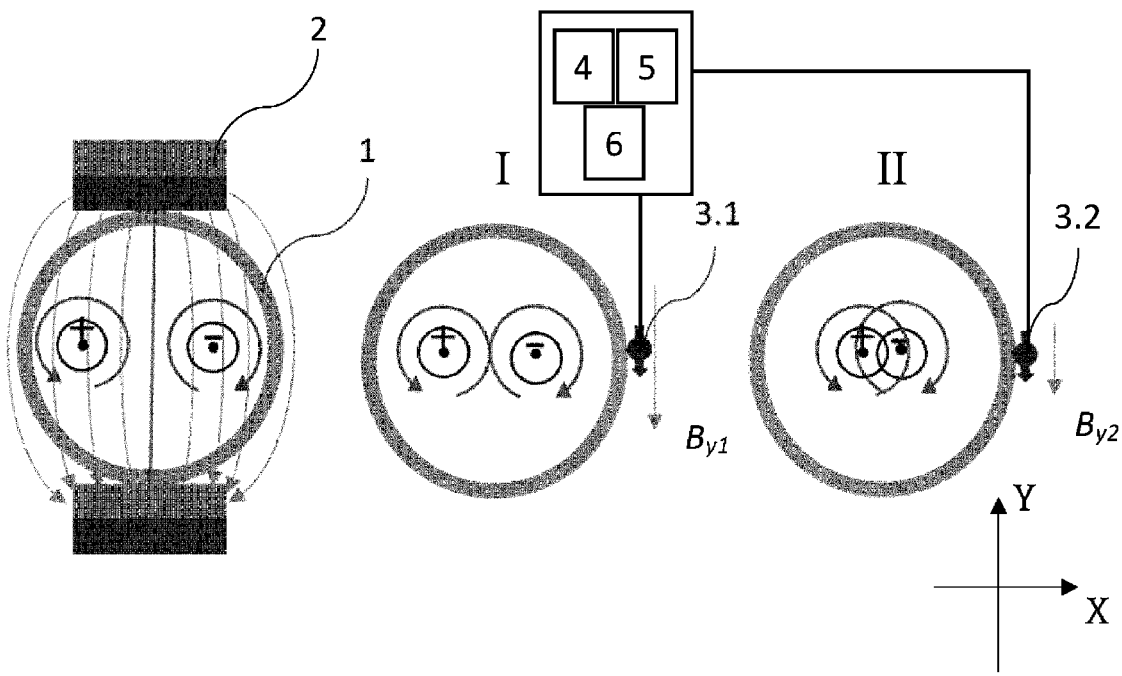
FIG. 1 shows a schematic illustration of a first embodiment of the device according to the present disclosure.

FIG. 1 shows a schematic representation of a first embodiment of the device according to the invention, in particular three cross sections through the device offset in the longitudinal direction of the guide body 1. The device for determining a flow-rate-dependent variable of a flowable and conductive medium in a guide body 1 for guiding the medium, in particular a measuring pipe or a pipeline, comprises a magnetic-field-generating device 2 for generating a first magnetic field that separates mobile charge carriers in the flowing medium. The magnetic-field-generating device 2 is two permanent magnets arranged diametrically in a guide body cross-section. Alternatively, the magnetic-field-generating device 2 can comprise a coil arrangement with at least one coil, in particular two coils preferably arranged diametrically on the lateral surface of the guide body 1, which is operated via an operating circuit in such a way that it generates a first magnetic field that is substantially constant over time or one that is variable over time.

Furthermore, the device comprises a magnetic-field-sensitive measuring arrangement which is configured to determine a second magnetic field generated by the mobile charge carriers. According to the embodiment of FIG. 1, the magnetic-field-sensitive measuring arrangement comprises a first magnetic-field-sensitive measuring device 3.1 which has a material that is sensitive to magnetic fields and is optically excitable. The first magnetic-field-sensitive measuring device 3.1 is arranged on the outer lateral surface of the guide body at a distance from the magnetic-field-generating device 2 in the longitudinal direction. Part of the magnetic-field-sensitive measuring arrangement is an optical excitation unit 4 for the optical excitation of the first magnetic-field-sensitive measuring device 3.1 and an optical detection unit 5 for detecting a measurement signal, in particular a fluorescence signal, which correlates with a change and/or a strength of the second magnetic field. The magnetic-field-sensitive measuring arrangement also comprises a second magnetic-field-sensitive measuring device 3.2, also having a magnetic-field-sensitive material. The first magnetic-field-sensitive measuring device 3.1 and the second magnetic-field-sensitive measuring device 3.2 are arranged so as to be offset relative to one another in the flow direction of the medium, in particular the longitudinal direction of the guide body 1, such that they are each exposed to different magnetic field states when the medium is flowing and the second magnetic field is present. The first magnetic-field-sensitive measuring device 3.1 is arranged between the magnetic-field-generating device 2 and the second magnetic-field-sensitive measuring device 3.42. The first magnetic-field-sensitive measuring device 3.1 and the second magnetic-field-sensitive measuring device 3.2 are each arranged on a transverse axis X which is oriented perpendicular to the main field axis Y of the first magnetic field. In addition, the first magnetic-field-sensitive measuring device 3.1 and the second magnetic-field-sensitive measuring device 3.2 are attached on the same side of the guide body 1. A straight line connecting the first magnetic-field-sensitive measuring device 3.1 and the second magnetic-field-sensitive measuring device 3.2 runs parallel to the longitudinal axis of the guide body 1. Alternatively, the magnetic-field-generating device (2) can be arranged between the first magnetic-field-sensitive measuring device (3.1) and the second magnetic-field-sensitive measuring device (3.2). This allows a bidirectional determination of the flow-rate-dependent variable.

Furthermore, the device comprises an evaluation circuit 6 that is configured to determine the flow-rate-dependent variable. Here, measurement signals of at least two different magnetic field states are included in the determination of the flow-rate-dependent variable. The first magnetic field causes the charge carriers in the flowing medium to separate. This leads to a first path with positive charge carriers and a second path with negative charge carriers. Due to the mobile charge carriers, the two paths each generate the second magnetic field. The second magnetic field changes as the first magnetic field decreases. As a result, the two separated paths approach each other again in the flow direction after the magnetic-field-generating device 2 until they meet and the generated second magnetic field disappears. The magnetic field measured at the measuring positions of the first magnetic-field-sensitive measuring device 3.1 and the second magnetic-field-sensitive measuring device 3.2 proportionally comprises the generated second magnetic field and thus depends on the flow rate of the medium. The magnetic field determined by means of the first magnetic-field-sensitive measuring device 3.1 and the second magnetic-field-sensitive measuring device 3.2 can also comprise flow-rate-independent components of the first magnetic field. These can be determined by means of an empty pipe calibration and taken into account in the determination of the flow-rate-dependent variable. The first magnetic field state is defined by the magnetic field present at a first distance from the magnetic-field-generating device 2 at the measuring position of the first magnetic-field-sensitive measuring device 3.1. The second magnetic field state is defined by the magnetic field present at a second distance from the magnetic-field-generating device 2 at the measuring position of the second magnetic-field-sensitive measuring device 3.2. The second distance is greater than the first distance. Alternatively, one of the two magnetic field states can comprise portions of the first magnetic field generated by the magnetic-field-generating device 2. For example, the first magnetic-field-sensitive measuring device 3.1 can be arranged in a common cross-section with the magnetic-field-generating device 2. Alternatively, the distance of the first magnetic-field-sensitive measuring device 3.1 and/or of the second magnetic-field-sensitive measuring device 3.2 to the magnetic-field-generating device 2 can be selected in such a way that the first magnetic field present at the first magnetic-field-sensitive measuring device 3.1 and/or at the second magnetic-field-sensitive measuring device 3.2 is less than a boundary value. The boundary value can correspond to a lower detection limit of the magnetic-field-sensitive measuring arrangement. According to the depicted embodiment, the evaluation circuit 6 is configured to determine the flow-rate-dependent variable on the basis of a first measurement signal detected in the first magnetic-field-sensitive measuring device 3.1 in conjunction with a second measurement signal detected in the second magnetic-field-sensitive measuring device 3.2.

According to the alternative, according to which the magnetic-field-generating device 2 comprises a coil arrangement with at least one coil, the device can comprise a control circuit which is configured to control an operating variable—i.e. an operating current, an operating voltage or a time duration in which the operating current or the operating voltage is applied to the coil—in such a way that measured values of the measurement signal of the magnetic-field-sensitive measuring arrangement, in particular of the first magnetic-field-sensitive measuring device 3.1 and/or of the second magnetic-field-sensitive measuring device 3.2, assume a target value. In this case, the evaluation circuit 6 is configured to determine the flow-rate-dependent variable depending on the operating variable and/or on a change in the operating variable.

In the depicted embodiment of FIG. 1 and also in the following embodiments, at least the first magnetic-field-sensitive measuring device 3.1 has a crystal body with at least one defect center or a gas cell. The crystal body can comprise a diamond having at least one nitrogen defect center, a silicon carbide having at least one silicon defect center, or a hexagonal boron nitride having at least one defect color center. The gas cell can comprise at least one cell enclosing a gaseous alkali metal. The second magnetic-field-sensitive measuring device 3.2 can likewise comprise a crystal body with at least one defect center or a gas cell.

Figure 2:
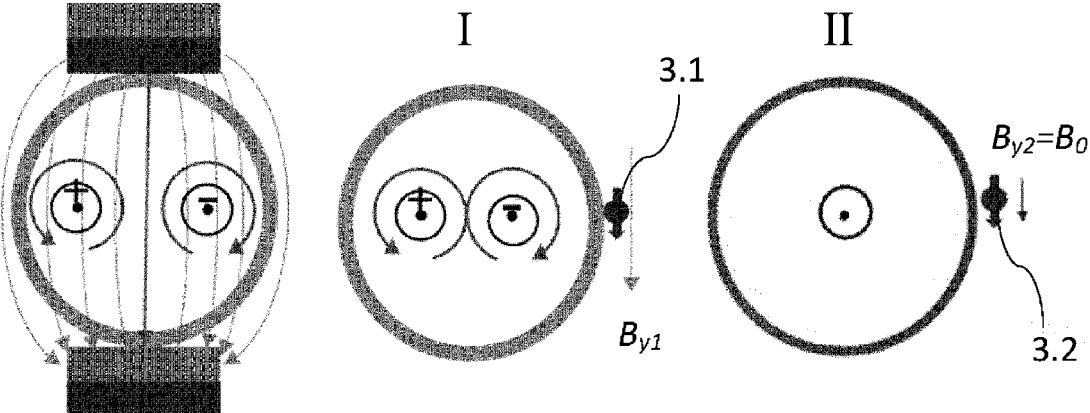
FIG. 2 shows a schematic representation of a second embodiment of the device according to the present disclosure.

FIG. 2 shows a schematic representation of a second embodiment of the device according to the invention, in particular three cross sections through the device offset in the longitudinal direction of the guide body 1. The second embodiment differs from the first embodiment substantially in that one of the two magnetic field states describes a magnetic field which is free of the second magnetic field. For this purpose, the second magnetic-field-sensitive measuring device 3.2 is spaced so far away from the magnetic-field-generating device 2 that the magnetic field detectable at the measuring position of the second magnetic-field-sensitive measuring device 3.2 is free of the contribution of the first magnetic field and the second magnetic field, regardless of the flow rate of the medium and the magnetic field strength of the magnetic-field-generating device 2. The evaluation circuit 6 is then configured to determine the flow-rate-dependent variable on the basis of a first measurement signal detected at the first magnetic-field-sensitive measuring device 3.1 in conjunction with a reference signal detected at the second magnetic-field-sensitive measuring device 3.2—i.e. the proportion of the first magnetic field and of the second magnetic field is zero. The reference signal can alternatively also be provided without a second magnetic-field-sensitive measuring device 3.2, for example by the operator.

Figure 3:
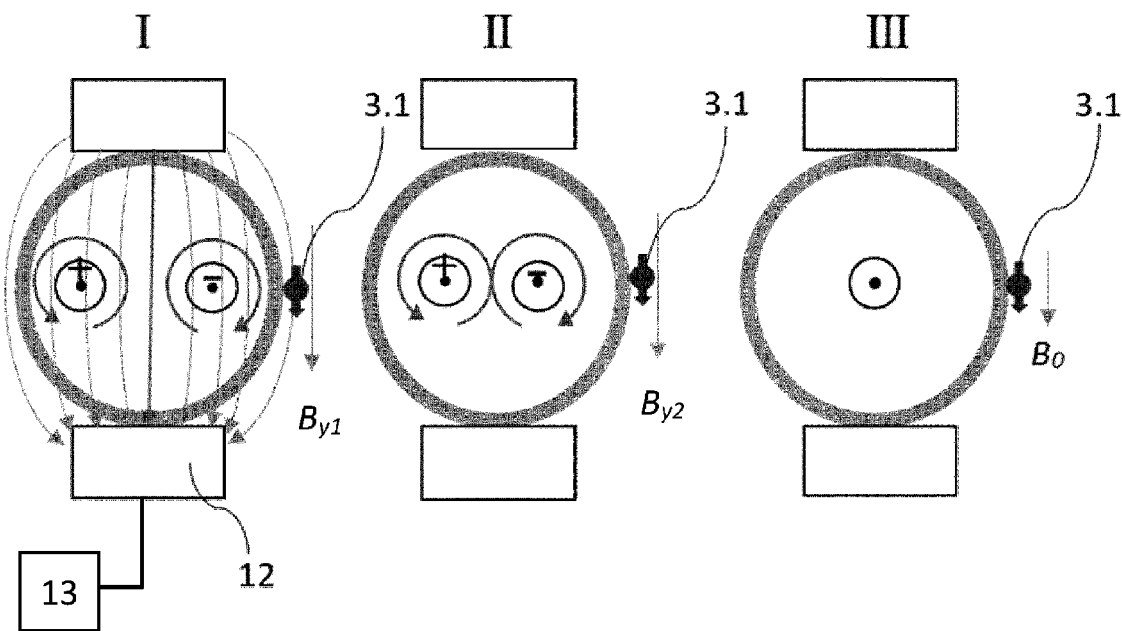
FIG. 3 shows a schematic representation of a third embodiment of the device according to the present disclosure.

FIG. 3 shows a schematic representation of a third embodiment of the device according to the invention, in particular three magnetic field states to which the first magnetic-field-sensitive measuring device 3.1 is exposed. According to the third embodiment, the magnetic-field-generating device 2 has a coil arrangement with two diametrically arranged coils. An operating circuit 13 is configured to operate the coils of the coil arrangement 12. For this purpose, the operating circuit can be configured to apply a predefined voltage curve or current curve to the coils. The magnetic-field-generating device 2 and the first magnetic-field-sensitive measuring device 3.1 are arranged in a common cross-sectional plane of the guide body 1. However, the first magnetic-field-sensitive measuring device 3.1 can also be arranged at a distance from the coil arrangement. The magnetic-field-sensitive measuring arrangement does not have a second magnetic-field-sensitive measuring device. The at least two magnetic field states are generated by the coil arrangement. The first magnetic field state can be determined by the state of the magnetic field while the at least one coil is energized and thus when the first magnetic field is present. The second magnetic field state can be determined by the state of the magnetic field during a resting phase, i.e. with coils not energized. Depending on the time of the determination of the currently present magnetic field at the first magnetic-field-sensitive measuring device 3.1, the change in the second magnetic field relative to the first magnetic field state can be determined, and the flow-rate-dependent variable can be determined therefrom. The resting phase can be selected such that it is ensured that a third magnetic field state is formed in which the first magnetic field and the second magnetic field are zero. In this case, a potential offset of the determined magnetic field can be determined which originates from external magnetic fields. This offset can be taken into account for the determination of the flow-rate-dependent variable. Alternatively, the temporal progress and variables derived therefrom—such as the magnetic field change over time—of the magnetic field present at the measuring position of the first magnetic-field-sensitive measuring device 3.1 can also be included in the determination of the flow-rate-dependent variable.

Figure 4:
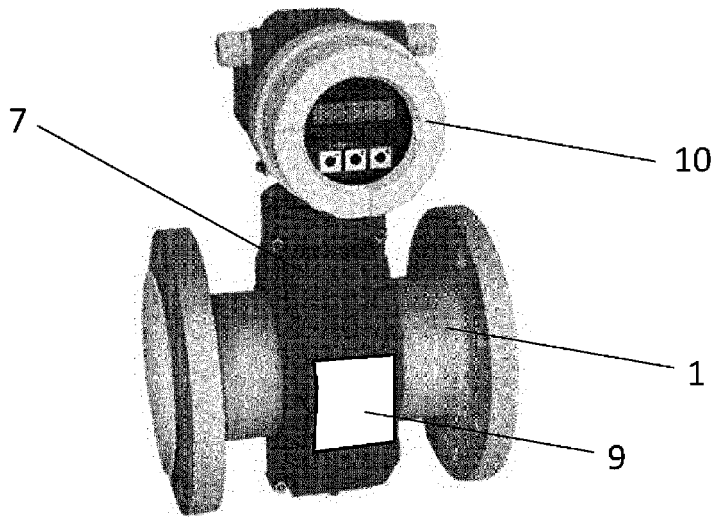
FIG. 4 shows a perspective view of an embodiment of the device according to the present disclosure.

FIG. 4 shows a perspective view of a further embodiment of the device according to the invention. The magnetic-field-generating device and/or the magnetic-field-sensitive measuring arrangement can be attached to an outer lateral surface of the guide body 1 in a mechanically separable manner.

For this purpose, the device has a fastening device 9 with which the magnetic-field-generating device and the magnetic-field-sensitive measuring arrangement, in particular the housing 7, can be detachably fastened to the outer lateral surface in a form-fitting and/or force-fitting manner. A sensor 10 comprises the operating circuit, the evaluation circuit, and optionally the control circuit.

Figure 5:
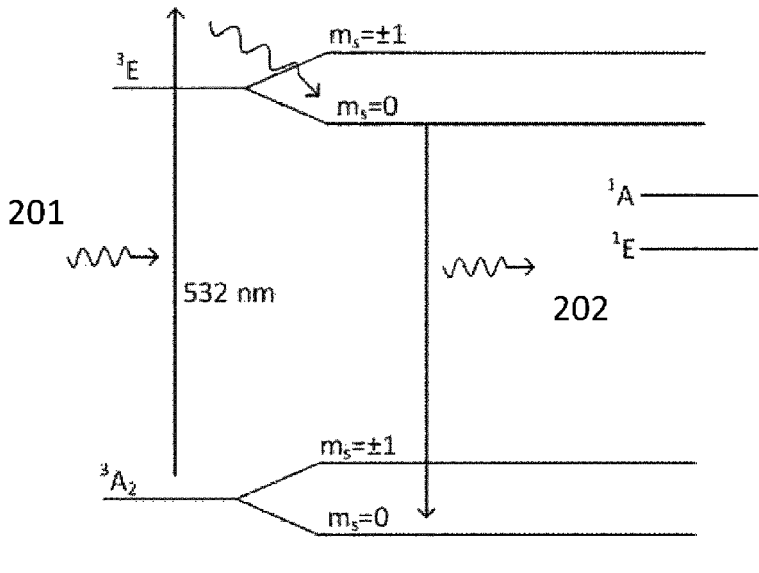
FIG. 5 shows a simplified energy diagram for a negatively charged NV center in the diamond.

FIG. 5 shows a simplified energy diagram for a negatively charged NV center in a diamond to give an exemplary explanation of the excitation and fluorescence of a defect in a crystal body. The following considerations can be transferred to other crystal bodies having corresponding vacancies.

In the diamond, each carbon atom is typically covalently bonded to four further carbon atoms. A nitrogen vacancy center (NV center) consists of a vacancy in the diamond lattice, i.e. an unoccupied lattice site, and a nitrogen atom as one of the four neighboring atoms. In particular, the negatively charged $NV^-$ centers are important for the excitation and evaluation of fluorescence signals. In the energy diagram of a negatively charged NV center, in addition to a triplet ground state 3A, there is an excited triplet state 3E, each of which has three magnetic substates ms=0, ±1. Furthermore, there are two metastable singlet states 1A and 1E between the ground state 3A and the excited state 3E.

Excitation light 1 from the green range of the visible spectrum, e.g. an excitation light 1 with a wavelength of 532 nm, excites an electron from the ground state 3A into a vibrational state of the excited state 3E, which returns to the ground state 3A by emitting a fluorescence photon 2 with a wavelength of 630 nm. An applied magnetic field with a magnetic field strength B leads to a splitting (Zeeman splitting) of the magnetic sub-states, so that the ground state consists of three energetically separated sub-states, each of which can be excited. However, the intensity of the fluorescence signal is dependent on the respective magnetic substate from which it was excited, so that the magnetic field strength B, for example, can be calculated using the Zeeman formula on the basis of the distance between the fluorescence minima. In the context of the present invention, further possibilities for evaluating the fluorescence signal are provided, such as the evaluation of the intensity of the fluorescent light, which is likewise proportional to the applied magnetic field. An electrical evaluation can in turn be done, for example, via a Photocurrent Detection of Magnetic Resonance (PDMR). In addition to these examples for evaluating the fluorescence signal, there are other possibilities which also fall within the scope of the present invention.

The excitation of gas cells is not explicitly shown, but in gas cells as well, the excitation with light of a defined wavelength causes an excitation of an electron, wherein an emission of a fluorescent light subsequently follows. For example, the intensity and/or the wavelength of the emitted fluorescent light is used to determine the magnetic field.

The invention claimed is:

1. A device for determining a flow-rate-dependent variable of a flowable and conductive medium in a guide body for guiding the medium, comprising:

a magnetic-field-generating device for generating a first magnetic field that separates mobile charge carriers in the medium;

a magnetic-field-sensitive measuring arrangement for determining a second magnetic field generated by the mobile charge carriers, the magnetic-field-sensitive measuring arrangement including:

a first magnetic-field-sensitive measuring device having a magnetic-field-sensitive and optically excitable material, an optical excitation unit for the optical excitation of the first magnetic-field-sensitive measuring device, and an optical detection unit for detecting a measurement signal, including a fluorescence signal, that correlates with a change and/or a strength of the second magnetic field; and an evaluation circuit that is configured to determine the flow-rate-dependent variable, wherein measurement signals of at least two different magnetic field states are included in the determination of the flow-rate-dependent variable.

2. The device according to claim 1, wherein the magnetic-field-generating device includes at least one permanent magnet.

3. The device according to claim 1, wherein the magnetic-field-generating device includes at least one coil.

4. The device according to claim 3, wherein the at least one coil is configured to generate the at least two different magnetic field states, wherein a first magnetic field state of the at least two different magnetic field states corresponds to a magnetic field present at the first magnetic-field-sensitive measuring device during a resting phase of the at least one coil, wherein, during the resting phase, the magnetic field present at the first magnetic-field-sensitive measuring device is less than a boundary value, wherein a second magnetic field state of the at least two different magnetic field states corresponds to a magnetic field present at the first magnetic-field-sensitive measuring device during a feed phase of the at least one coil, wherein during the feed phase the magnetic field present at the first magnetic-field-sensitive measuring device is greater than the boundary value, and wherein the detection unit is configured to detect a first measurement signal during the resting phase and a second measurement signal during the feed phase of the magnetic-field-generating device.

5. The device according to claim 4, wherein the magnetic-field-generating device and the first magnetic-field-sensitive measuring device are arranged in a common cross-sectional plane of the guide body.

6. The device according to claim 1, wherein a conductivity of the medium is included in the determination of the flow-rate-dependent variable.

7. The device according to claim 1, wherein the magnetic-field-sensitive measuring arrangement further includes a second magnetic-field-sensitive measuring device having a magnetic-field-sensitive material, and wherein the first magnetic-field-sensitive measuring device and the second magnetic-field-sensitive measuring device are arranged offset relative to one another in a flow direction of the medium such that they are each exposed to different magnetic field states when the medium is flowing and the second magnetic field is present.

8. The device according to claim 7, wherein the magnetic-field-generating device is arranged between the first magnetic-field-sensitive measuring device and the second magnetic-field-sensitive measuring device.

9. The device according to claim 7, wherein the first magnetic-field-sensitive measuring device is arranged between the magnetic-field-generating device and the second magnetic-field-sensitive measuring device.

10. The device according to claim 8, wherein a distance of the first magnetic-field-sensitive measuring device and/or of the second magnetic-field-sensitive measuring device to the magnetic-field-generating device is selected such that the first magnetic field present at the first magnetic-field-sensitive measuring device and/or at the second magnetic-field-sensitive measuring device is less than a boundary value.

11. The device according to claim 7, further comprising:

a control circuit, configured to regulate an operating variable of the magnetic-field-generating device such that measured values of the first magnetic-field-sensitive measuring device and/or of the second magnetic-field-sensitive measuring device assume a target value, wherein the evaluation circuit is configured to determine the flow-rate-dependent variable depending on the operating variable and/or a change in the operating variable.

12. The device according to claim 10, wherein the evaluation circuit is configured to determine the flow-rate-dependent variable on the basis of a first measurement signal detected in the first magnetic-field-sensitive measuring device in conjunction with a second measurement signal detected in the second magnetic-field-sensitive measuring device or a reference signal.

13. The device according to claim 1, wherein the magnetic-field-generating device and/or the magnetic-field-sensitive measuring arrangement can be attached to an outer lateral surface of the guide body in a mechanically separable manner.

14. The device according to claim 13, further comprising:

a fastening device with which the magnetic-field-generating device and/or the magnetic-field-sensitive measuring arrangement can be detachably fastened to the outer lateral surface.

15. The device according to claim 1, wherein at least the first magnetic-field-sensitive measuring device includes a gas cell or crystal body with at least one defect center.

16. The device according to claim 15, wherein the crystal body is a diamond having at least one nitrogen defect center, a silicon carbide having at least one silicon defect center, or a hexagonal boron nitride having at least one defect color center.

17. The device according to claim 15, wherein the gas cell comprises at least one cell enclosing a gaseous alkali metal.

* * * * *